United States Patent
Kawahara (10) Patent No.: US 7,991,991 B2
(45) Date of Patent: Aug. 2, 2011

(54) APPARATUS OPERABLE UNDER AN OPERATING SYSTEM, METHOD OF CONTROLLING APPARATUS AND COMPUTER-READABLE RECORDING MEDIUM

(75) Inventor: Masanori Kawahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 771 days.

(21) Appl. No.: 12/071,175

(22) Filed: Feb. 15, 2008

(65) Prior Publication Data

US 2008/0209202 A1    Aug. 28, 2008

(30) Foreign Application Priority Data

Feb. 22, 2007  (JP) ................. 2007-042863

(51) Int. Cl.
 *G06F 9/00* (2006.01)
 *G06F 15/177* (2006.01)
 *G06F 3/00* (2006.01)
 *G06F 13/00* (2006.01)

(52) U.S. Cl. .................. 713/2; 713/1; 709/222; 710/10; 710/104

(58) Field of Classification Search .................. 713/1, 2; 709/222; 710/10, 104
See application file for complete search history.

(56) References Cited

U.S. PATENT DOCUMENTS

| | | | | |
|---|---|---|---|---|
| 5,134,580 A | * | 7/1992 | Bertram et al. | 713/1 |
| 5,261,104 A | * | 11/1993 | Bertram et al. | 713/1 |
| 6,727,920 B1 | * | 4/2004 | Vineyard et al. | 715/810 |
| 7,234,054 B2 | * | 6/2007 | Rothman et al. | 713/2 |

FOREIGN PATENT DOCUMENTS

| | | |
|---|---|---|
| JP | 6-89121 | 3/1994 |
| JP | 2004-199128 | 7/2004 |
| JP | 2006-91946 | 4/2006 |

* cited by examiner

*Primary Examiner* — Stefan Stoynov
(74) *Attorney, Agent, or Firm* — Staas & Halsey LLP (57) ABSTRACT

According to an aspect of an embodiment, an apparatus operable under an operating system having an input device for inputting information, the apparatus being activated by booting a BIOS and the operating system successively comprises, a storage for storing information; and a processor receiving specific information inputted by the input device before completion of booting the operating system, storing the specific information into the storage, determining whether or not the specific information is stored in the storage after completion of booting the operating system, rebooting the BIOS when the specific information is stored in the storage and displaying information related to the BIOS.

15 Claims, 8 Drawing Sheets

APPARATUS OPERABLE UNDER AN OPERATING SYSTEM, METHOD OF CONTROLLING APPARATUS AND COMPUTER-READABLE RECORDING MEDIUM

BACKGROUND OF THE INVENTION

1. Field of the Invention

The present invention relates to a method for displaying a setup screen of a basic input output system (BIOS).

2. Description of the Related Art

The following documents have been disclosed as the related art:

Japanese Unexamined Patent Application Publication No. 6-89121;

Japanese Unexamined Patent Application Publication No. 2004-199128; and

Japanese Unexamined Patent Application Publication No. 2006-91946.

SUMMARY

According to an aspect of an embodiment, an apparatus operable under an operating system having an input device for inputting information, the apparatus being activated by booting a BIOS and the operating system successively comprises, a storage for storing information; and a processor receiving specific information inputted by the input device before completion of booting the operating system, storing the specific information into the storage, determining whether or not the specific information is stored in the storage after completion of booting the operating system, rebooting the BIOS when the specific information is stored in the storage and displaying information related to the BIOS successively.

DESCRIPTION OF THE PREFERRED EMBODIMENTS

The realization of high-speed boot-up processing has been desired for PCs, and time required to start a BIOS and to load an operating system (OS) has been shortened.

However, with such a shortened starting time, a key-operation time allowed for selecting entry of a BIOS setup screen or the like during a power-on self-test (POST) has also been shortened. Thus, some users who want to enter the BIOS setup screen may not be able to operate a certain key because of the short key-operation time. As a result, the users fail to enter the BIOS setup screen and may feel frustrated.

The realization of higher-speed boot-up processing causes the key-operation time to be shorter. As a result, this will increase users' frustration.

Embodiments will be described below with reference to the attached drawings.

Figure 1:
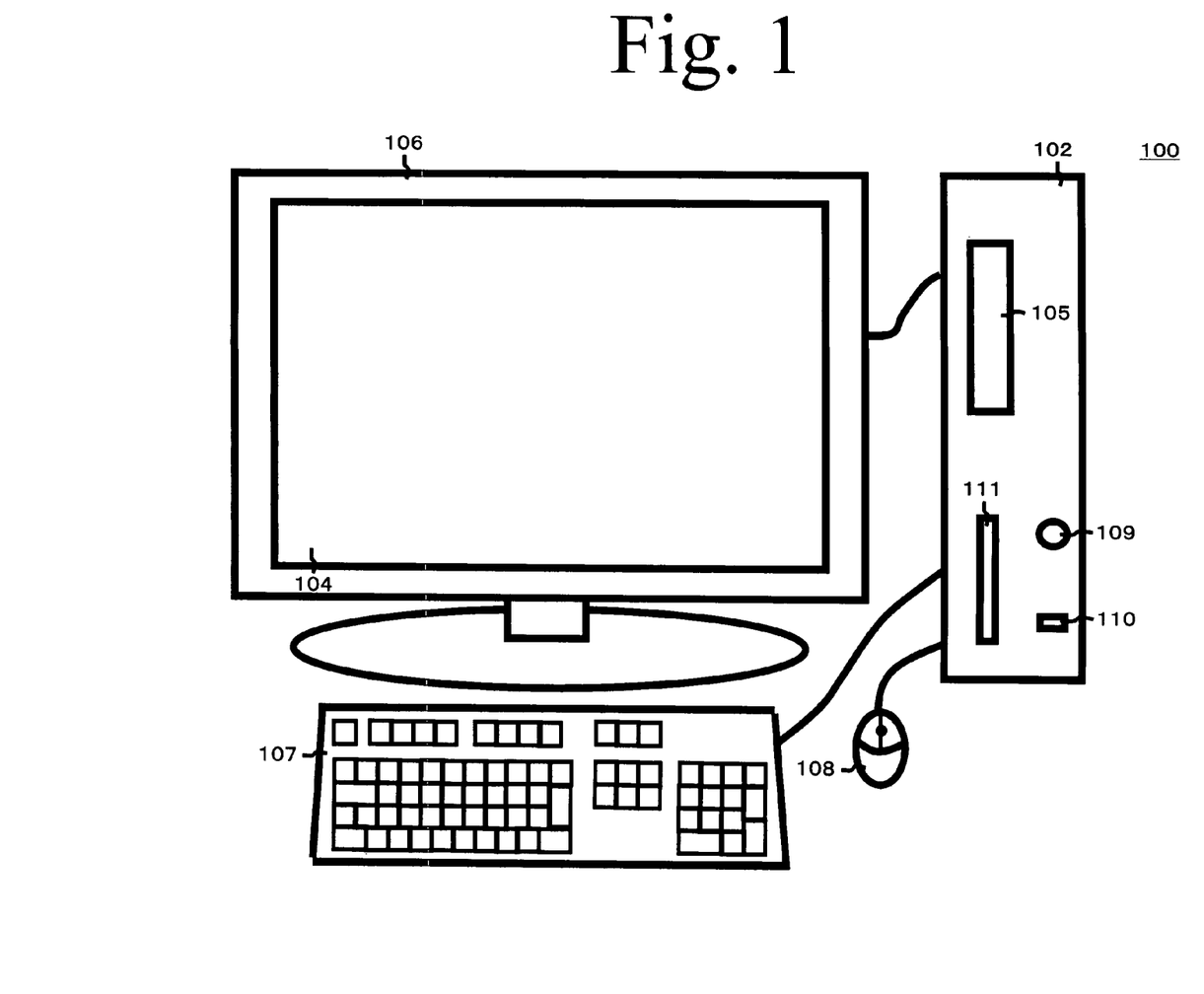
FIG. 1 is a schematic diagram of a personal computer (PC)

FIG. 1 is a schematic diagram of a PC. A PC 100 includes a PC system unit 102, a display 106, a keyboard 107, and a mouse 108. A central processing unit (CPU), a memory, and the like are built in the PC system unit 102. The display 106 displays an image on a display screen 104 on the basis of a command sent from the PC system unit 102. The keyboard 107 is operated to issue a command to the PC system unit 102 by a user. The mouse 108 causes a mouse cursor to move onto an icon on the display screen 104 and causes a command to be issued corresponding to the icon in response to a mouse button thereof being clicked.

The PC system unit 102 further includes a power button 109 for turning on the PC 100, a universal serial bus (USB) connector 110 based on USB standards, a CD/DVD loading slot 105 into which a compact disc (CD) or a digital versatile disk (DVD) is loaded, and a Floppy® disk (FD) loading slot 111 into which an FD is loaded.

Figure 2:
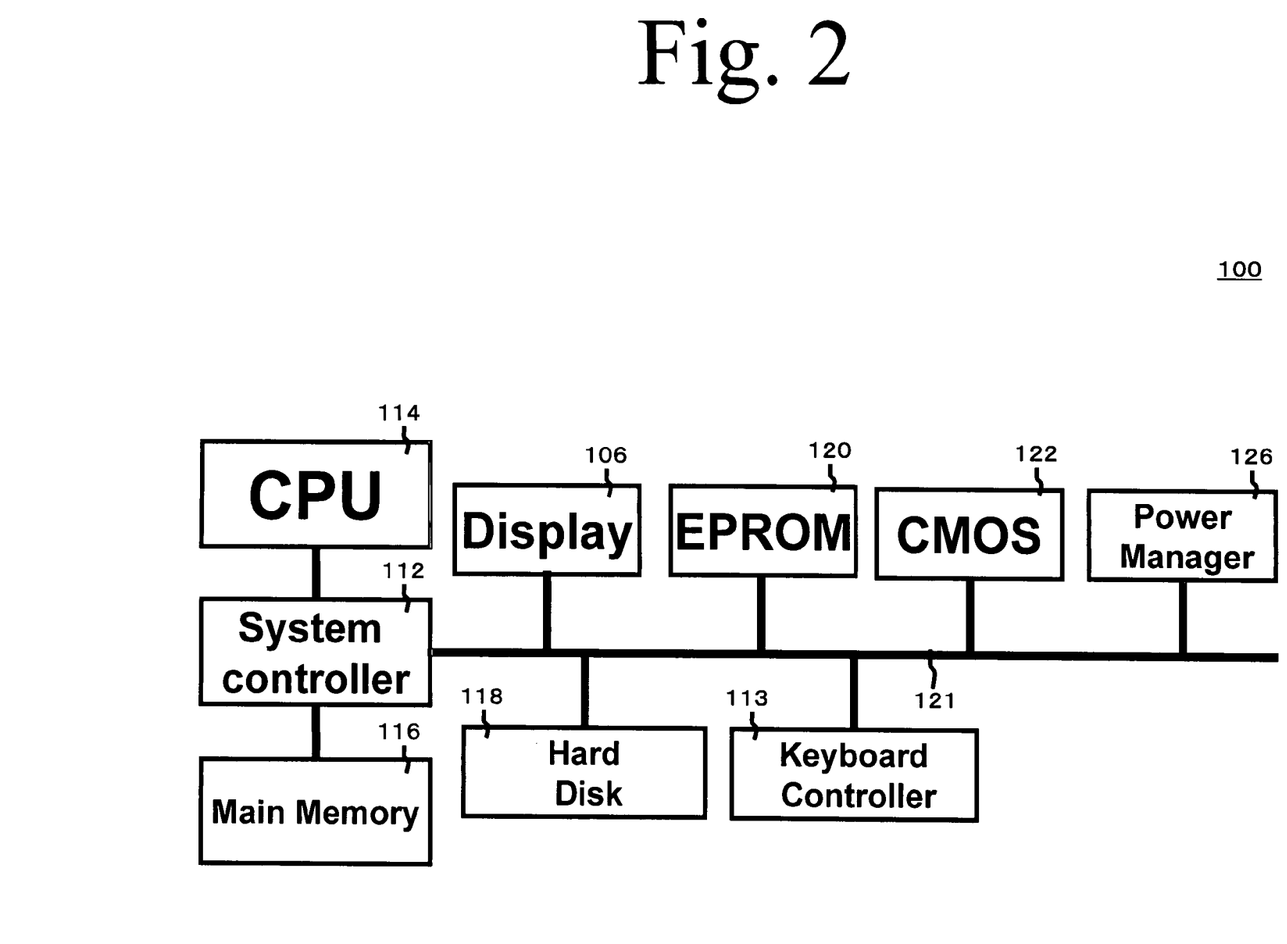
FIG. 2 is a block diagram showing an overall structure of hardware of the PC.

Block Diagram of PC Hardware:

FIG. 2 is a schematic block diagram showing an example of a hardware configuration of the PC 100 shown in FIG. 1. Note that a block shown in FIG. 2 will be denoted by the same reference numeral as the corresponding component shown in FIG. 1.

A CPU 114, a main memory 116, the display 106, a hard disk 118, an erasable programmable read-only memory (EPROM) 120, a keyboard controller 113, a complementary metal oxide semiconductor (CMOS) 122, and a power manager 126 are connected to a system controller 112 via a bus 121 in the PC 100. Each of the blocks shown in FIG. 2 will be described below.

The system controller 112 controls the entire system, for example, manages data input/output of the system. The CPU 114 executes programs such as an OS and a BIOS, which are executed in the main memory 116. The main memory 116 is used as a workspace for executing a program read from the hard disk 118. The OS, the BIOS, a certain application, and the like are executed in the main memory 116 in an embodiment. This will be specifically described below with reference to FIG. 3. The display 106 displays an image on the basis of a command issued by the CPU 114 via the system controller 112. The OS and an application program are stored in the hard disk 118. The BIOS, which is executed immediately after the PC 100 is turned on, is stored in the EPROM 120. The keyboard controller 113 detects inputs from the keyboard 107 and the mouse 108. The setting of a BIOS menu is stored in the CMOS 122. The power manager 126 manages the operation of the power button 109. The PC 100 is operable under an operating system. The PC 100 is activated by booting the BIOS and the OS successively.

Figure 3:
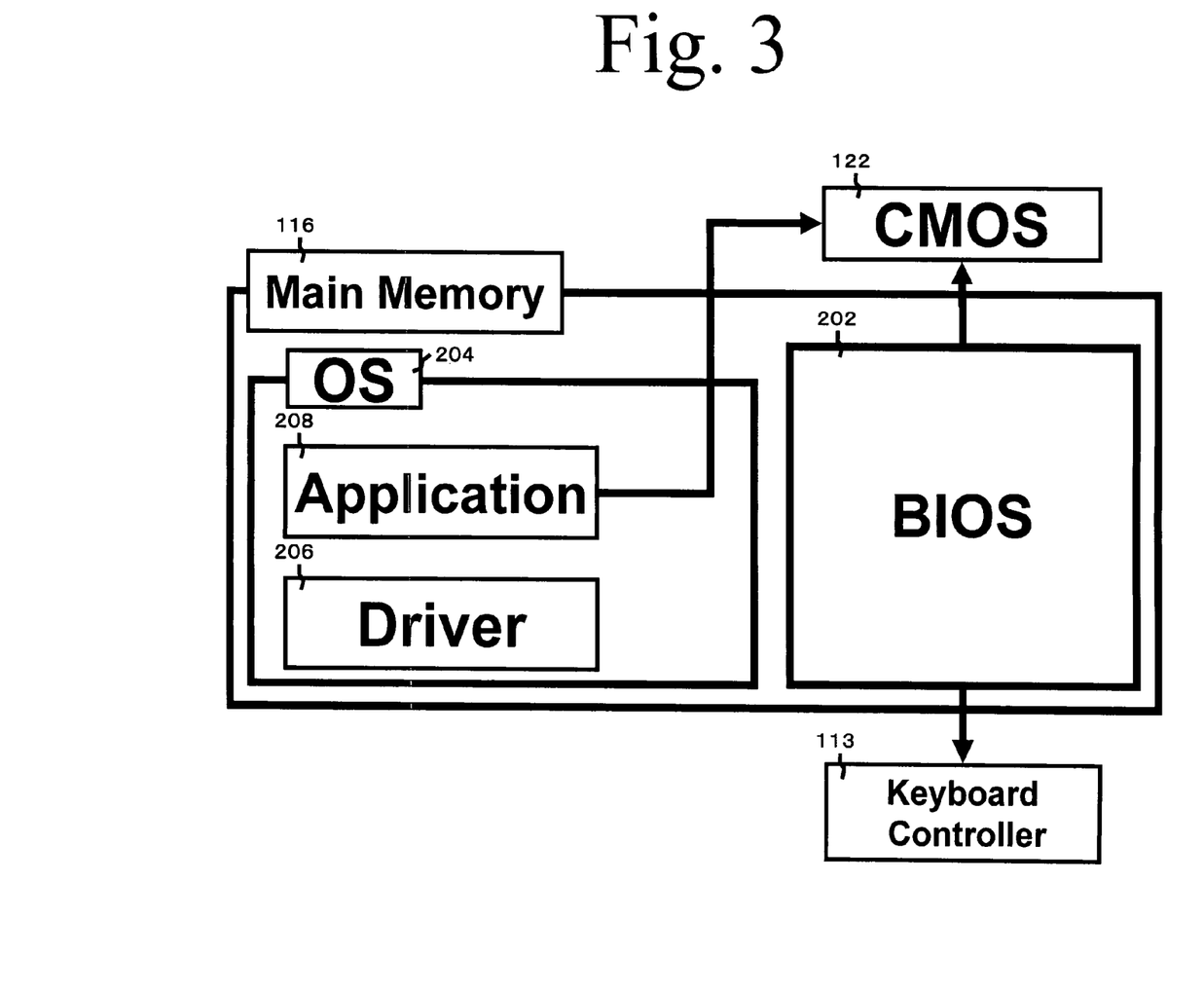
FIG. 3 is a functional block diagram of display processing.
Figure 4:
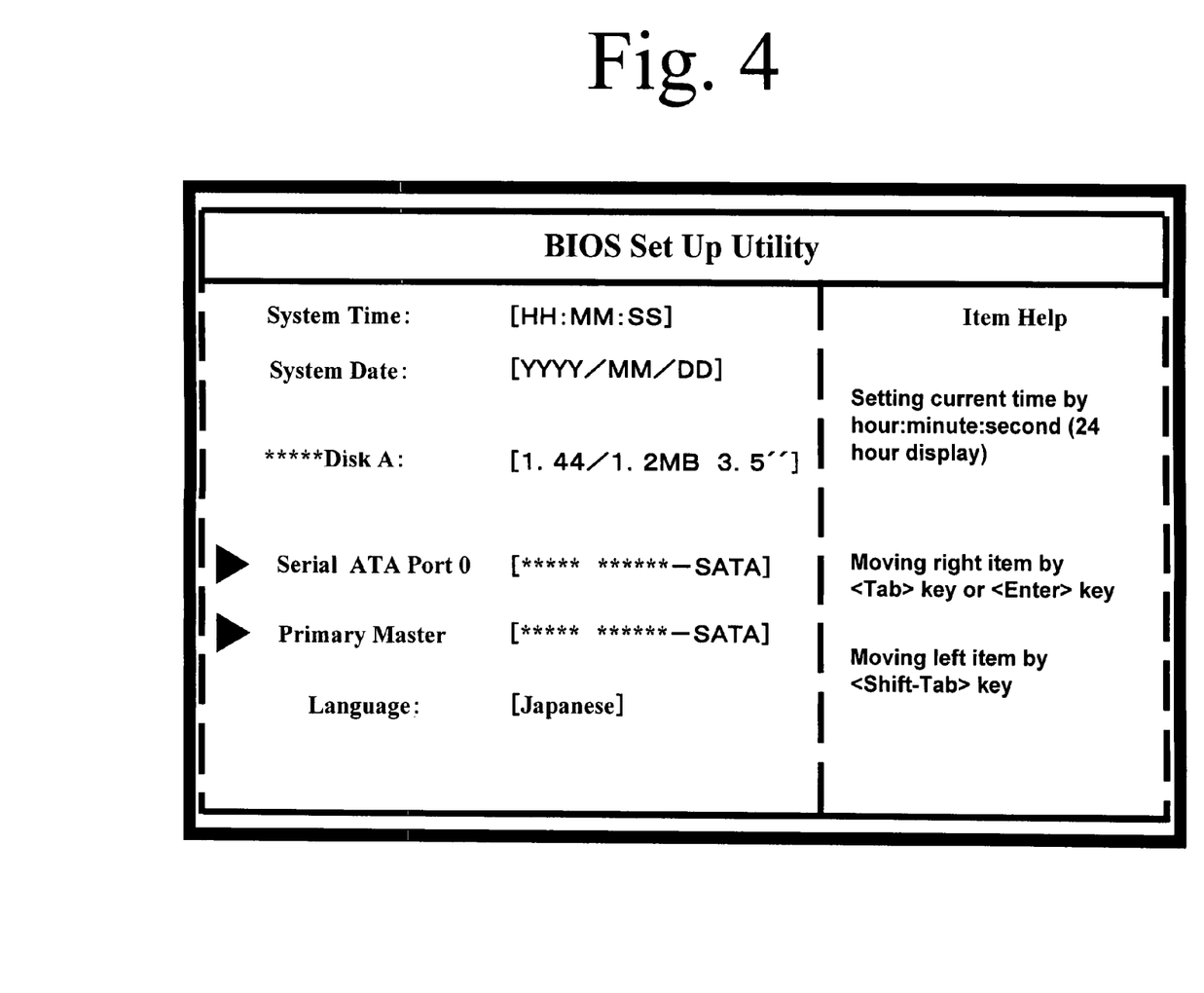
FIG. 4 is a diagram showing a BIOS setup screen.
Figure 5:
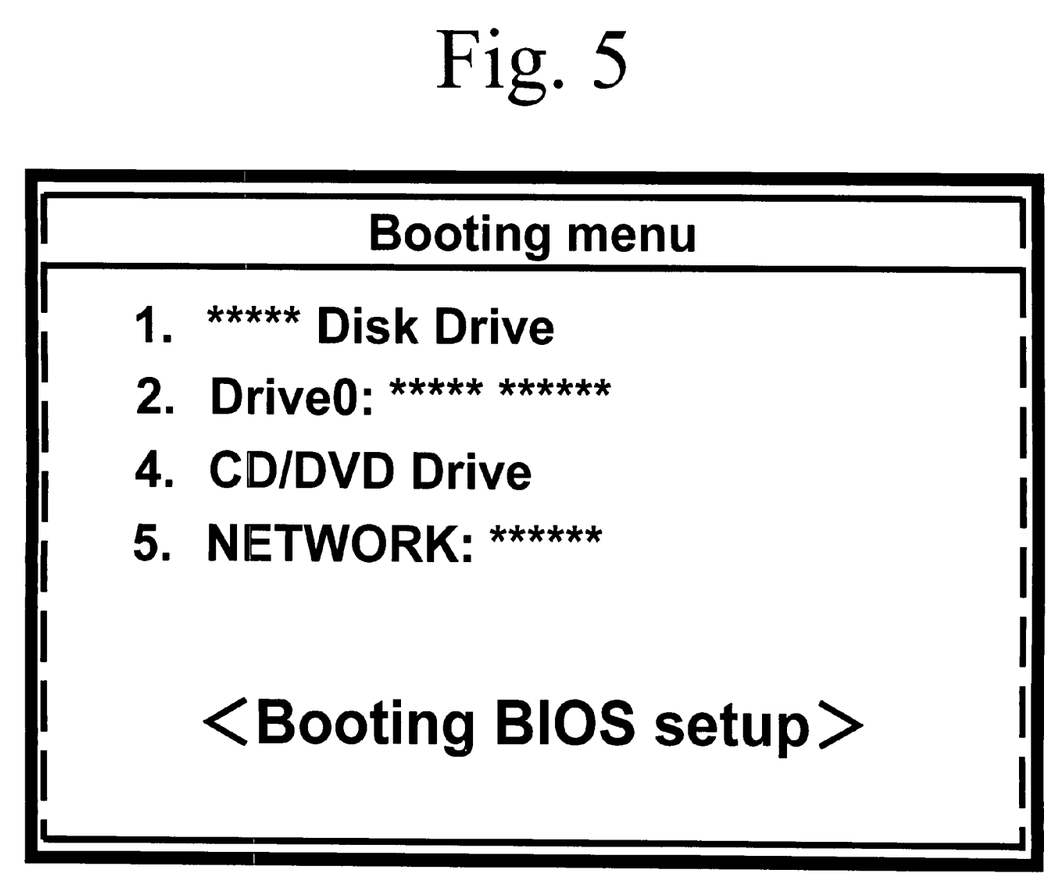
FIG. 5 is a diagram showing a boot menu screen.

Functional Block Diagram of Screen Display Processing:

FIG. 3 is a functional block diagram schematically showing an example of screen display processing of a BIOS setup or a boot menu. A screen-display processing function is realized by the CPU 114 and, for example, a program stored in the hard disk 118. In the BIOS setup, a hardware platform including a memory, a hard disk drive, and a floppy disk drive is set. FIG. 4 shows an example of a BIOS setup screen. In the boot menu, a boot drive order is set. FIG. 5 shows an example of a boot menu screen. The screen-display processing function for the BIOS setup or boot menu is realized by the main memory 116, the CMOS 122, and the keyboard controller 113. A BIOS 202 and an OS 204 are executed in the main memory 116. Moreover, a driver 206 and an application 208 are executed on the OS 204. Each of the blocks shown in FIG. 3 will be described below. Note that blocks shown in FIG. 3 will be denoted by the same reference numerals as the corresponding components shown in FIG. 2, thereby avoiding redundant description.

BIOS:

The BIOS 202 detects specific data inputs made using the keyboard 107 and the mouse 108, which are input devices. That is, the BIOS 202 obtains information related to a key operation which is detected by the keyboard controller 113, and determines whether or not a key for entering the BIOS setup screen or boot menu screen is operated. The BIOS 202 detects a specific data input in the case where the key for entering the BIOS setup screen or boot menu screen is operated. If the BIOS 202 determines such a key is operated, a BIOS-setup display-request flag or a boot-menu display-request flag is stored in the CMOS 122 by the BIOS 202. After the BIOS 202 detects the BIOS-setup display-request flag or the boot-menu display-request flag being stored in the CMOS 122, the BIOS 202 displays data of the BIOS setup screen or boot menu screen, the data being prestored in the EPROM 120, on the display 106 via the system controller 112.

Driver:

The driver 206 is executed on the OS 204 after the OS 204 is loaded. Here, the term "after the OS 204 is loaded", as used herein, means the state where a log-in screen is displayed. The driver 206 accepts inputs from the keyboard 107 and the mouse 108, which are the input devices. The driver 206 obtains information related to a key operation which is detected by the keyboard controller 113. The execution of the driver 206 on the OS 204 prevents the BIOS 202 from obtaining the information related to a key operation which is detected by the keyboard controller 113. This means that the OS 204 manages the information related to a key operation after the OS 204 is loaded.

Application:

The application 208 is executed after the driver 206 is executed on the OS 204. The application 208 determines whether the BIOS 202 detects the specific data input. The application 208 determines whether or not the BIOS-setup display-request flag or the boot-menu display-request flag is stored in the CMOS 122. If the BIOS-setup display-request flag or the boot-menu display-request flag is stored in the CMOS 122, the OS 204 is reloaded. As a result, the BIOS setup screen or the boot menu screen can be entered even in the case where the key for entering the BIOS setup screen or boot menu screen is operated after a BIOS startup screen is closed and before the driver 206 is executed on the OS 204. Here, the application 208 may be, for example, integrated with the OS 204, included in an accompanying application of the OS 204, or installed in a recovery disc.

Figure 6:
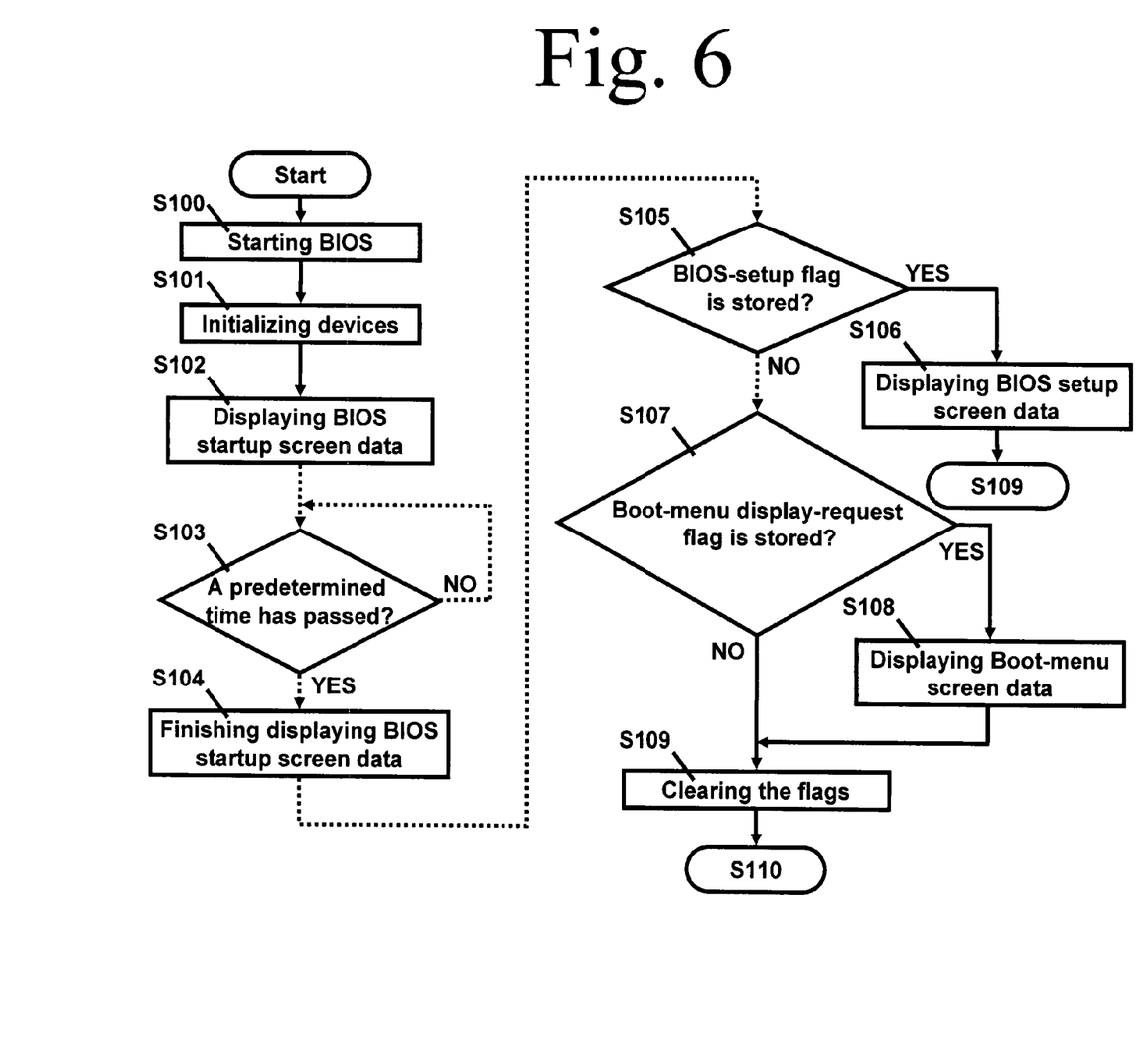
FIG. 6 is a part of a flowchart of the entire processing.

Overall Processing Flow:

The screen display processing for the BIOS setup and the boot menu will be described with reference to FIG. 6.

In step S100, if the power button 109 is operated by a user, the CPU 114 starts the BIOS 202 stored in the EPROM 120. The BIOS 202 is executed in the main memory 116. The process proceeds to step S101.

In step S101, the BIOS 202 initializes various devices such as the keyboard controller 113. The process proceeds to step S102.

In step S102, the BIOS 202 displays data of the BIOS startup screen, which is prestored in the CMOS 122, on the display 106 via the system controller 112. The process proceeds to step S103.

In step S103, the BIOS 202 determines whether a predetermined time for displaying the data of the BIOS startup screen has passed. If the predetermined time is determined to have passed, the process proceeds to step S104.

In step S104, the BIOS 202 finishes displaying the data of the BIOS startup screen on the display 106. The process proceeds to step S105.

In step S105, the BIOS 202 determines whether the BIOS-setup display-request flag is stored in the CMOS 122. The BIOS-setup display-request flag is generated by the BIOS 202 when a user operates a key for displaying the BIOS setup screen. Such a key-operation interrupt processing will be described with reference to FIG. 8 below. If the BIOS-setup display-request flag is determined to be stored, the process proceeds to step S106. In step S106, the BIOS 202 displays the data of the BIOS setup screen, the data being stored in the EPROM 120, via the system controller 112. And a processor performs a BIOS setup process. In contrast, if the BIOS-setup display-request flag is determined not to be stored, the process proceeds to step S107.

In step S107, the BIOS 202 determines whether the boot-menu display-request flag is stored in the CMOS 122. The boot-menu display-request flag is generated by the BIOS 202 when a user operates a key for displaying the boot menu. Such a key-operation interrupt will be described with reference to FIG. 8 below. If the boot-menu display-request flag is determined to be stored, the process proceeds to step S108. In step S108, the BIOS 202 displays the data of the boot menu screen, the data being stored in the EPROM 120, on the display 106 via the system controller 112. In contrast, if the boot-menu display-request flag is determined not to be stored, the process proceeds to step S109.

In step S109, the BIOS 202 clears the BIOS-setup display-request flag and/or boot-menu display-request flag stored in the CMOS 122. Or a processor deletes specific information upon receiving inputted information for finishing a BIOS setup process. The process proceeds to step S110 in FIG. 7.

Figure 7:
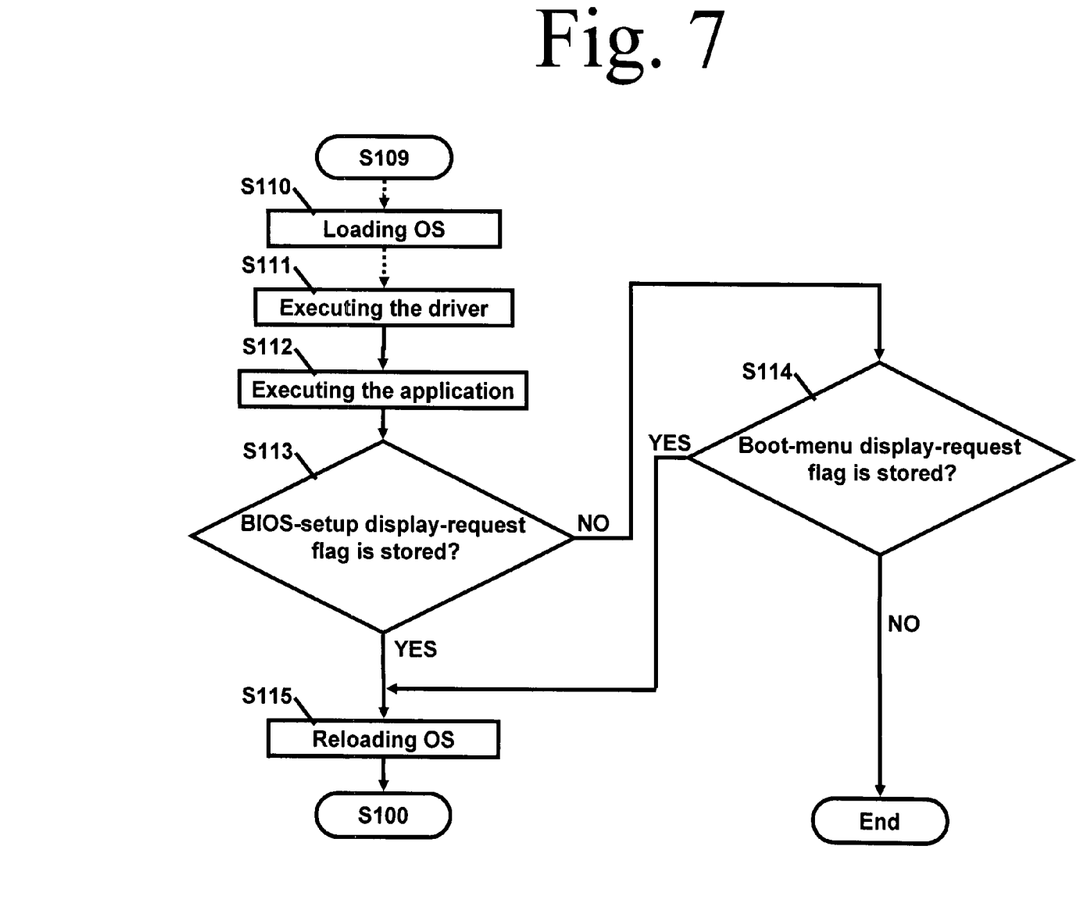
FIG. 7 is the remaining part of the flowchart of the entire processing.

In step S110 in FIG. 7, the BIOS 202 loads the OS 204, which is stored in the hard disk 118, by executing the OS 204 in the main memory 116. The process proceeds to step S111.

In step S111, the OS 204 executes the driver 206, which is stored in the hard disk 118, on the OS 204. This means that the OS 204 manages information related to a key operation after the OS 204 is loaded. The process proceeds to step S112.

In step S112, the OS 204 executes the application 208, which is stored in the hard disk 118, on the OS 204. The process proceeds to step S113.

In step S113, the application 208 determines whether the BIOS-setup display-request flag is stored in the CMOS 122 after completion of booting the operating system. If the BIOS-setup display-request flag is determined to be stored, the process proceeds to step S115. In contrast, if the BIOS-setup display-request flag is determined not to be stored, the process proceeds to step S114.

In step S114, the application 208 determines whether the boot-menu display-request flag is stored in the CMOS 122. If the boot-menu display-request flag is determined to be stored, the process proceeds to step S115. In contrast, if the boot-menu display-request flag is determined not to be stored, the process ends.

In step S115, the application 208 reloads the OS 204. The process returns to step S100 in FIG. 3 and the application 208 reboots the BIOS. According to this, the BIOS setup screen or boot menu screen can be displayed if the specific key for displaying the BIOS setup screen or boot menu is operated after the BIOS 202 clears the BIOS-setup display-request flag and/or the boot-menu display-request flag in step S109 in FIG. 3 and before the driver 206 is executed on the OS 204 in step S111 in FIG. 7. That is, if such a specific key or keys are operated, the BIOS-setup display-request flag or the boot-menu display-request flag or both are stored in the CMOS 122 at the time of reloading the OS 204 even after the BIOS-setup display-request flag or the boot-menu display-request flag or both are cleared. Thus, the BIOS 202 can display a predetermined screen or screens, which should be displayed, on the display 106 on the basis of the flag or flags.

Figure 8:
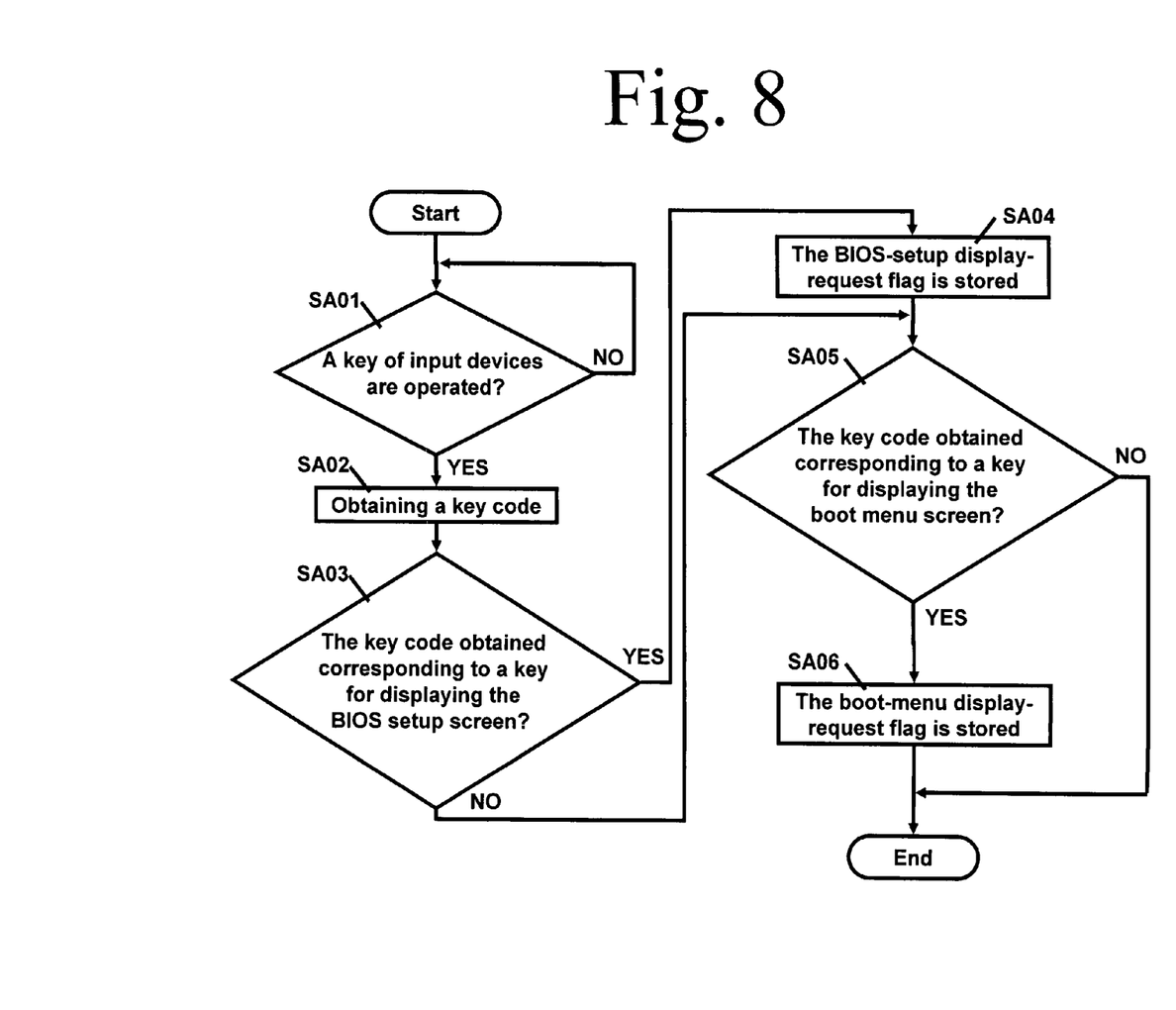
FIG. 8 is a flowchart of interrupt processing.

Key-Operation Interrupt Processing:

Next, key-operation interrupt processing will be described with reference to FIG. 8. The key-operation interrupt processing is performed during periods shown by dotted lines in FIGS. 6 and 7: between step S102 and step S105, between step S105 and step S107, between step S107 and step S109, and between step S109 and step S111. Such key-operation interrupt processing occurs if a user operates a key for displaying the BIOS setup screen or the boot menu screen.

In step SA01, the keyboard controller 113 determines whether a key of an input device such as the keyboard 107 or the mouse 108 is operated. If a key of the input device is operated, the process proceeds to step SA02.

In step SA02, the BIOS 202 receives a key code of the operated key from the keyboard controller 113 before completion of booting the OS. The process proceeds to step SA03.

In step SA03, the BIOS 202 determines whether the keycode obtained in step SA02 corresponds to a key for displaying the BIOS setup screen. If the obtained keycode corresponds to the key for displaying the BIOS setup screen, the process proceeds to step SA04. In contrast, if the obtained keycode does not correspond to the key for displaying the BIOS setup screen, the process proceeds to step SA05.

In step SA04, the BIOS-setup display-request flag is stored in the CMOS 122 by the BIOS 202. As a result, in step S105 in FIG. 6, the BIOS 202 can determine that the BIOS-setup display-request flag is stored in the CMOS 122, and the BIOS setup screen, which is stored in the EPROM 120, can be displayed. The process proceeds to step SA05.

In step SA05, the BIOS 202 determines whether the keycode obtained in step SA02 corresponds to a key for displaying the boot menu screen. If the obtained keycode corresponds to the key for displaying the boot menu screen, the process proceeds to step SA06. In contrast, if the obtained keycode does not correspond to the key for displaying the boot menu screen, the process ends.

In step SA06, the boot-menu display-request flag is stored in the CMOS 122 by the BIOS 202. As a result, in step S105 in FIG. 6, the BIOS 202 can determine that the boot-menu display-request flag is stored in the CMOS 122, and the boot menu screen, which is stored in the EPROM 120, can be displayed. Then, the process ends.

According to the embodiment, an application which is executed on an OS determines whether a key for entering a BIOS setup screen is operated even after the OS is loaded. If such a key is determined to be operated, the OS is reloaded and the BIOS setup screen is displayed. Thus, even if a PC is booted at a high speed, the BIOS setup screen can be displayed easily.

The above-described embodiment is not intended to limit other embodiments. Therefore, various modifications may occur insofar as they are within the scope of the embodiment.

What is claimed is:

1. An apparatus operable under an operating system having an input device for inputting information, the apparatus being activated by booting a program and the operating system successively, the operation of the program preceding the operation of the operating system, the apparatus comprising:
    a storage for storing information; and
    a processor for receiving specific information inputted by the input device by executing the program before completion of booting the operating system, storing the specific information into the storage, determining whether or not the specific information is stored in the storage by executing an application for detecting the specific information in the storage after completion of booting the operating system, rebooting the program when the specific information is stored in the storage and displaying information related to the program.

2. The apparatus of claim 1, wherein the storage stores the specific information stored before the rebooting when the processor reboots the apparatus.

3. The apparatus of claim 1, wherein the processor performs a program setup process on the basis of the specific information.

4. The apparatus of claim 3, wherein the processor deletes the specific information stored in the storage upon receiving inputted information for finishing the program setup process.

5. The apparatus of claim 1, wherein the information related to the program is a booting order of the apparatus.

6. A method of controlling an apparatus operable under an operating system having an input device for inputting information, the apparatus being activated by booting a program and the operating system successively, the operation of the program preceding the operation of the operating system, the method comprising:
    storing information into a storage;
    receiving specific information inputted by the input device by executing the program before completion of booting the operating system;
    storing the specific information into the storage;
    determining whether or not the specific information is stored in the storage after completion of booting the operating system by a processor by executing an application for detecting the specific information in the storage;
    rebooting the program when the specific information is stored in the storage; and
    displaying information related to the program.

7. The method of claim 6, wherein the storing stores the specific information stored before the rebooting when the rebooting reboots the program.

8. The method of claim 6, further comprising performing a program setup process on the basis of the specific information.

9. The method of claim 8, further comprising deleting the specific information stored in the storage upon receiving inputted information
    for finishing the program setup process.

10. The method of claim 6, wherein the information related to the program is a booting order of the apparatus.

11. A computer-readable recording medium that stores a computer program for controlling an apparatus, the apparatus operable under an operating system having an input device for inputting information, the apparatus being activated by booting a program and the operating system successively, the operation of the program preceding the operation of the operating system, the apparatus, according to a process comprising;
    storing information into a storage;
    receiving specific information inputted by the input device by executing the program before completion of booting the operating system;
    storing the specific information into the storage;
    determining whether or not the specific information is stored in the storage after completion of booting the operating system booting the operating system by executing an application for detecting the specific information in the storage;

rebooting the program when the specific information is stored in the storage; and displaying information related to the program.

12. The computer-readable recording medium of claim 11, wherein the storing stores the specific information stored before the rebooting when the rebooting reboots the program.

13. The computer-readable recording medium of claim 11, wherein the process further comprises performing a program setup process on the basis of the specific information.

14. The computer-readable recording medium of claim 13, wherein the process further comprises deleting the specific information stored in the storage upon receiving inputted information for finishing the program setup process.

15. The computer-readable recording medium of claim 11, wherein the information related to the program is a booting order of the apparatus.

* * * * *

UNITED STATES PATENT AND TRADEMARK OFFICE
CERTIFICATE OF CORRECTION

| | | |
|---|---|---|
| PATENT NO. | : 7,991,991 B2 | |
| APPLICATION NO. | : 12/071175 | |
| DATED | : August 2, 2011 | |
| INVENTOR(S) | : Kawahara | |

It is certified that error appears in the above-identified patent and that said Letters Patent is hereby corrected as shown below:

Column 6, Line 57-58, In Claim 11, delete "comprising;" and insert --comprising:--, therefor.

Signed and Sealed this
Eleventh Day of October, 2011

David J. Kappos
*Director of the United States Patent and Trademark Office*